(12) United States Patent
Ryu

(10) Patent No.: US 10,021,586 B1
(45) Date of Patent: Jul. 10, 2018

(54) PUSHING BACK PACKET NOT ACKNOWLEDGED BY BASE STATION

(71) Applicant: Intel IP Corporation, Santa Clara, CA (US)

(72) Inventor: Yong Nam Ryu, Gunposi (KR)

(73) Assignee: Intel IP Corporation, Santa Clara, CA (US)

(*) Notice: Subject to any disclaimer, the term of this patent is extended or adjusted under 35 U.S.C. 154(b) by 32 days.

(21) Appl. No.: 15/390,211

(22) Filed: Dec. 23, 2016

(51) Int. Cl.
*H04W 28/02* (2009.01)
*H04W 60/04* (2009.01)
*H04W 76/18* (2018.01)
*H04W 76/19* (2018.01)
*H04W 76/02* (2009.01)

(52) U.S. Cl.
CPC ... *H04W 28/0236* (2013.01); *H04W 28/0226* (2013.01); *H04W 60/04* (2013.01); *H04W 76/027* (2013.01); *H04W 76/028* (2013.01); *H04W 76/18* (2018.02); *H04W 76/19* (2018.02)

(58) Field of Classification Search
CPC ......... H04W 28/0236; H04W 28/0226; H04W 60/04; H04W 76/028; H04W 76/027; H04W 76/18; H04W 76/19
See application file for complete search history.

(56) References Cited

U.S. PATENT DOCUMENTS

2016/0295550 A1* 10/2016 Sharma ................... H04W 4/16

* cited by examiner

*Primary Examiner* — Jianye Wu
(74) *Attorney, Agent, or Firm* — Schiff Hardin LLP

(57) ABSTRACT

An apparatus for reducing latency in a User Equipment (UE), comprising a processor configured to push back a packet that is transmitted to but not acknowledged by a base station, from a Radio Link Control (RLC) layer; and trigger a Tracking Area Update (TAU) procedure based on the pushed back packet; and a radio frequency interface configured to transmit or receive the packet with the base station.

25 Claims, 5 Drawing Sheets

300

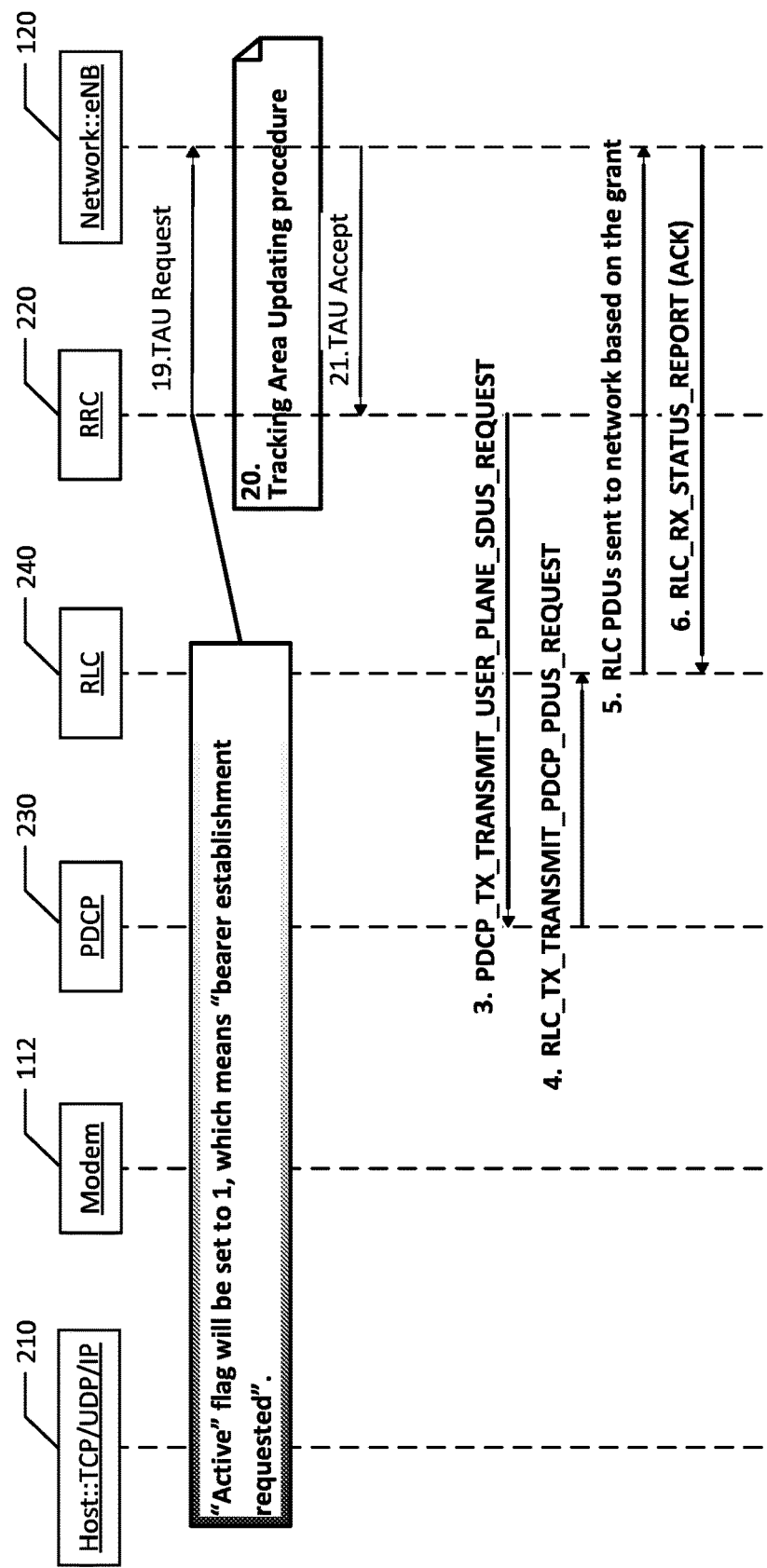

PUSHING BACK PACKET NOT ACKNOWLEDGED BY BASE STATION

TECHNICAL FIELD

The present disclosure generally relates to a User Equipment (UE) that pushes back packets that have not, from a perspective of a Radio Link Control (RLC) layer, been acknowledged by a base station.

BACKGROUND

Latency and packet delay are important factors in mobile networks of Long Term Evolution (LTE) and other telecommunications standards. For example, the modem implementation of the Third Generation Partnership Project (3GPP) specification risks packet loss and packet uplink latency when a Radio Resource Control (RRC) Connection Reestablishment Reject is received after a Radio Link Failure (RLF) from a network.

DESCRIPTION OF THE ASPECTS

The present disclosure is directed to a User Equipment (UE) configured to push back a Protocol Data Units (PDU) that is transmitted but not acknowledged by a base station, from the Radio Link Control (RLC) layer; and triggering a Tracking Area Update (TAU) procedure based on the pushed back PDU. Further, the UE may push back a Packet Data Convergence Protocol (PDCP) packets, which is still being processed after the RLF, from the PDCP layer. The UE is thereby prevented from missing packets and increasing latency after a Radio Link Failure (RLF).

Figure 1:
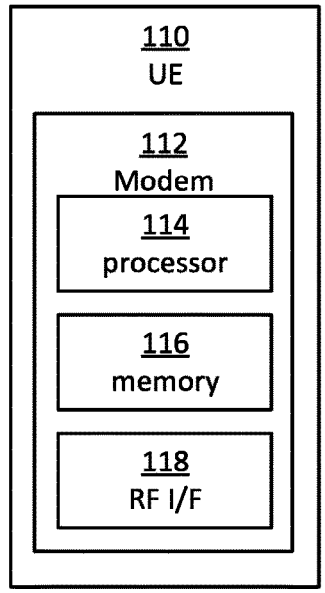
FIG. 1 illustrates a schematic diagram of an exemplary wireless communication system.
Figure 1:
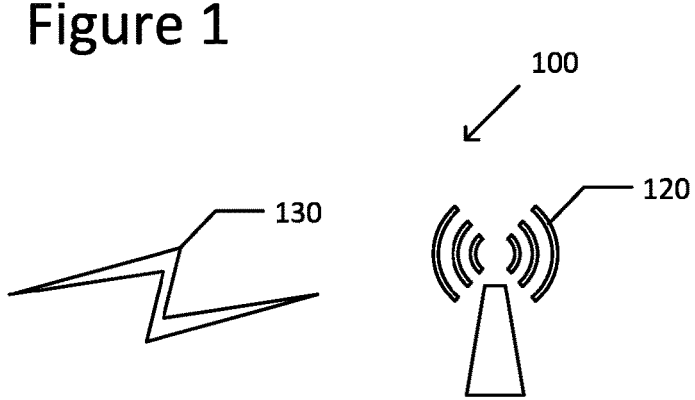

FIG. 1 illustrates a schematic diagram of an exemplary wireless communication system 100.

The wireless communication system comprises a mobile device 110 (User Equipment (UE)) communicating with a base station 120 (e.g., Evolved Node B (ENodeB)) over an air interface 130. The mobile device 110 and the base station 120 may implement a radio technology such as second generation (2G), third generation (3G), fourth generation (4G), and/or other existing generations, generations in development or to be developed in the future (e.g., fifth generation (5G), 6G, etc.).

The UE 110 comprises a modem 112. The modem 112 may comprise a processor 114, memory 116, and Radio frequency (RF) interface 118, among other elements.

The processor 114 may comprise one or more single-core or multi-core processors. For the purposes of this discussion, the term "processor" shall be understood to be circuit(s), processor(s), logic, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

The memory 116 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both. The memory 116 may be shared among the various processors or dedicated to particular processors.

The RF interface 118 may enable communication with wireless networks using modulated electromagnetic radiation through a non-solid medium 130. In various embodiments, the RF interface 118 may include switches, filters, amplifiers, etc. to facilitate the communication with the wireless network. The RF interface 118 may include a receive signal path which may include circuitry to down-convert received RF signals. The RF interface 118 may also include a transmit signal path which may include circuitry to up-convert baseband signals.

Figure 2:
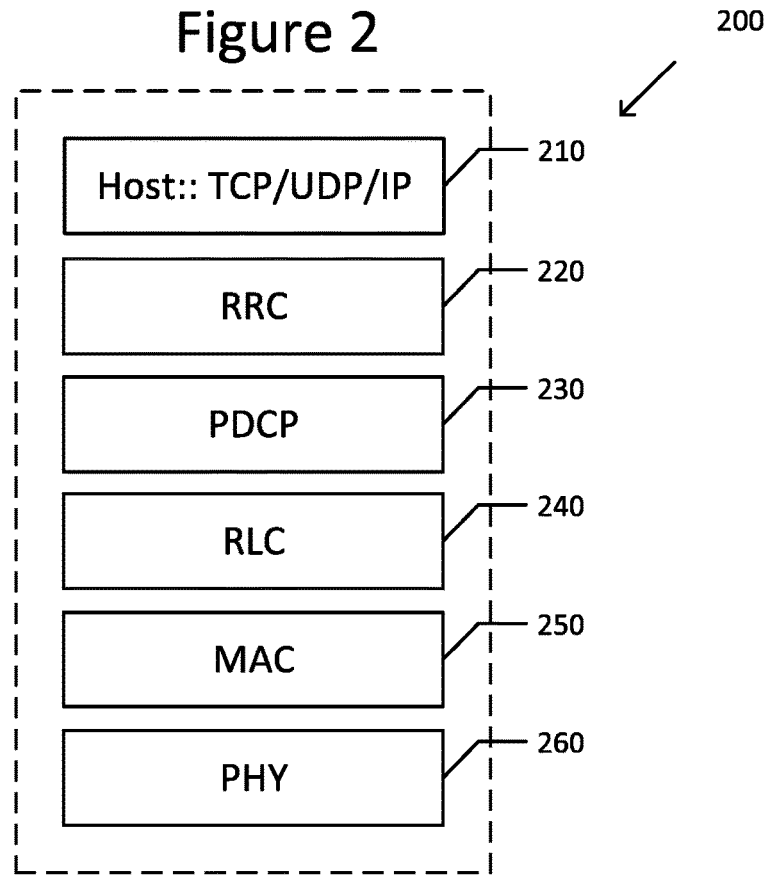
FIG. 2 illustrates a schematic diagram of an exemplary control plane protocol stack architecture of a wireless device of the wireless communication system of FIG. 1.

FIG. 2 illustrates a schematic diagram of a control plane protocol stack architecture 200 of a wireless device of the wireless communication system of FIG. 1.

The control plane 200 performs a function of exchanging control signal between the UE 110 and the base station 120. The control plane 200 includes a Radio Resource Control (RRC) layer 220, a Packet Data Convergence Protocol (PDCP) layer 230, a Radio Link Control (RLC) layer 240, a Medium Access Control (MAC) layer 250, and a physical (PHY) layer 260. Moreover, the control plane 200 may include other layers, but for the sake of brevity, are not shown.

The PHY layer 260 provides information transmission services using a radio transmission technology and corresponds to a first layer of an Open System Interconnection (OSI) layer. The PHY layer 260 is coupled to the MAC layer 250 through a transport channel, through which data is exchanged. The transport channel is defined by a scheme through which specific data are processed in the PHY layer 260.

The MAC layer 250 sends data transmitted from the RLC layer 240 through a logical channel to the PHY layer 260 through a proper transport channel, and further sends data transmitted from the PHY layer 260 through a transport channel to the RLC layer 240 through a proper logical channel. Further, the MAC layer 250 inserts additional information into data received through the logical channel and analyzes the inserted additional information from data received through the transport channel to perform a proper operation and controls a random access operation.

The MAC layer 250 and the RLC layer 240 are coupled to each other through a logical channel. The RLC layer 240 controls the setting and release of a logical channel. Generally, the RLC layer 240 divides a Service Data Unit (SDU) sent from an upper layer at a proper size and vice versa. Further, the RLC layer 240 takes charge of an error correction function through an automatic retransmission request (ARQ).

The PDCP layer 230 is disposed above the RLC layer 240 and performs a header compression function for reducing the size of an Internet Protocol (IP) packet header comprising control information that is relatively large in size and unnecessary in order to efficiently send an IP packet. The PDCP layer 230 also transmits data without loss even when a Radio Network Controller (RNC) providing a service changes due to the movement of the UE 110.

The RRC layer 220 controls logical channels, transport channels, and physical channels in relation to establishment, re-configuration and release of Radio Bearers (RBs). The RB signifies a service provided by the second layer of an OSI layer for data transmissions between the terminal and the E-UTRAN (Evolved UMTS Terrestrial Radio Access Network). If an RRC connection is established between the RRC layer 220 of the UE 110 and the RRC layer 220 of the base station 120, the UE 110 is in an RRC connected state. Otherwise, the UE 110 is in an RRC idle state.

A Non-Access Stratum (NAS) layer (not shown), which is placed over the RRC layer 220, performs functions, such as session management and Mobility Management (MM).

Transmission Control Protocol (TCP)/User Datagram Protocol (UDP)/Internet Protocol (IP) layer 210 represents protocols used for sending bits of data. TCP and UDP are alternative protocols, and they each built on top of the IP.

Figure 3:
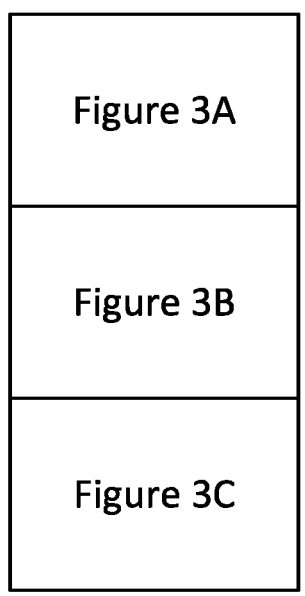
FIGS. 3A-3C illustrates an exemplary wireless communication connection process in accordance with an aspect of the disclosure.
Figure 3:

FIG. 3 illustrates a wireless communication connection process 300 in accordance with an aspect of the disclosure. FIG. 3 is broken up into three FIGS. 3A-3C in the order shown in FIG. 3. The process is described in the context of Long Term Evolution (LTE), but the disclosure is not limited in this respect.

Figure 3A:
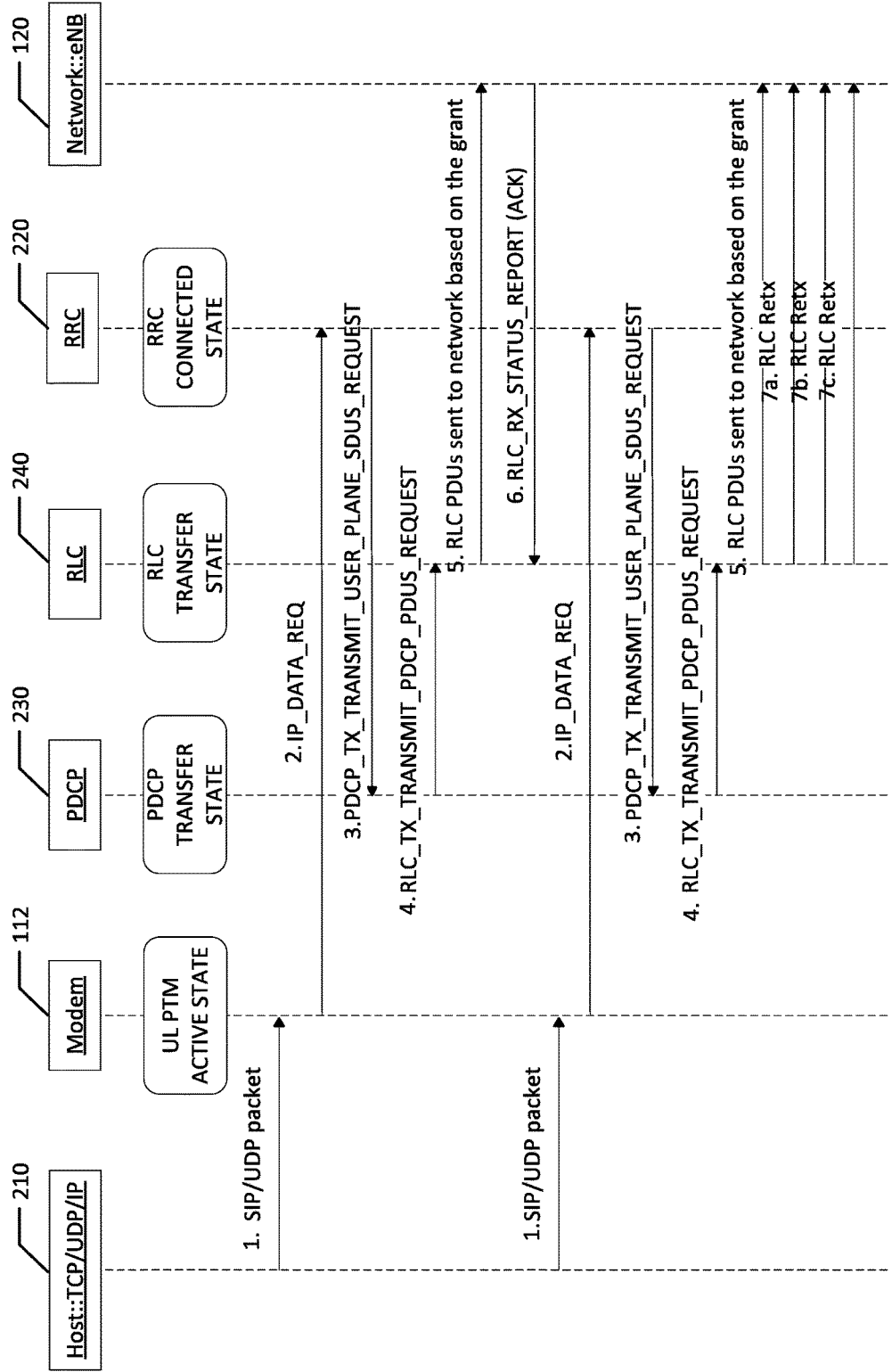
Figure 3B:
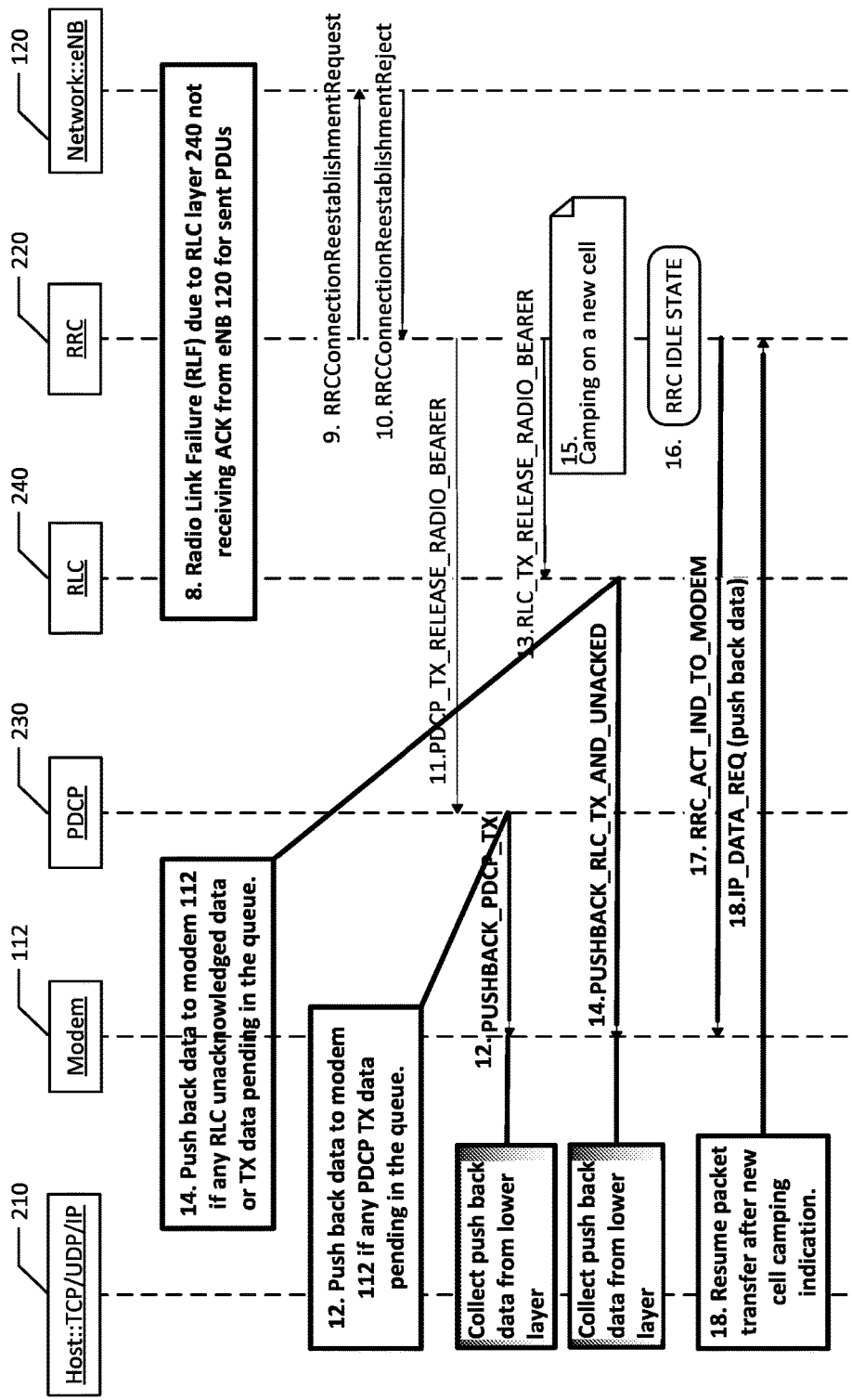

By way of overview, the layers shown in FIGS. 3A-3C are comprised within the UE 110, with the exception of the network (i.e., base station) 120. The process 300 comprises pushing back RLC PDUs, which were not acknowledged by the base station 120, from the perspective of the RLC layer 240, and possibly any PDCP packets that were in progress. Also, after a RLF and RRC Reestablishment Reject, a TAU procedure with an "active" flag set to 1 is forced using the push backed packets from the RLC layer 240, and possibly also the PDCP layer 230. The TAU procedure with "active" flag set to 1 provides the UE 110 with an immediate Radio Bearer (RB) assignment procedure so that the UE 110 can send the push backed packets to base station 120 without unnecessary latency.

Referring to FIG. 3A, the process begins with the modem 112 in an active state, the PDCP layer 230 in a transfer state, the RLC layer 240 in a transfer state, and the RRC layer 220 in a connected state.

The host 210, at Step 1, sends a Session Internet Protocol (SIP) or User Datagram Protocol packet to the modem 112.

The modem 112 responds, at Step 2, by sending an IP data request (IP_DATA_REQ) to the RRC layer 220. The RRC layer 220, at Step 3, responds by sending to the PDCP layer 230 a request to transmit Service Data Unit (SDU) (PDCP_TX_TRANSMIT_PDCP_PDUS_REQUEST). The PDCP layer 230 then responds, at Step 4, by sending to the RLC layer 240 a request to transmit Packet Data Units (PDUs) (RLC_TX_TRANMIT_PDCP_PDUS_REQUEST). The RLC layer 240 then sends, at Step 5, PDUs to the base station 120 based on the grant. If the connection between the UE 110 and the base station 120 is being established properly, at Step 6 the base station 120 sends to the RLC layer 240 an acknowledgement of receipt of the PDUs (RLC_RX_STATUS_REPORT (ACK)).

Steps 1-5 are repeated for a next connection establishment. However, in the example shown, this second time the connection between the UE 110 and the base station 120 is not being established properly, and the base station 120 does not acknowledge to the RLC layer 240 receipt of the PDUs. The RLC layer 240 tries retransmitting the PDUs, in this case three times, in steps 7a-c (RLC Retx).

Continuing to FIG. 3B, if after a predetermined number of retransmission attempts in response to which the RLC layer 240 does not receive an acknowledgement from the base station 120 that the PDUs were received, then at Step 8 it is determined that there is a Radio Link Failure (RLF).

The RRC layer 220 then sends, at Step 9, to the base station 120 a RRC Connection Reestablishment Request. In this case the base station 120 responds in Step 10 by sending back a RRC Connection Reestablishment Reject. The RRC 220 then releases, at Step 11, the PDCP layer 230 from the radio bearer (PDCP_TX_RELEASE_RADIO_BEARER).

Following the release of the radio bearer in step 11, optionally, the PDCP layer 230 may push back any transmission data pending in a queue, at Step 12 (PUSHBACK_PDCP_TX). This transmission data is stored in the memory 116 in a lower layer. The RRC layer 220 releases, at Step 13, the RLC layer 240 from the radio bearer (RLC_TX_RELEASE_RADIO_BEARER).

The RLC layer 240 pushes back, at Step 14, the unacknowledged PDUs. These PDUs are stored in the memory 116 in a lower layer. While FIG. 3B shows step 12 (push back PDCP packets) occurring before step 14 (pushing back PDUs), the disclosure is not limited in this respect. These two pushbacks may occur in a different order or simultaneously.

The RRC layer 220 then eventually camps on a new cell, at Step 15, as the old cell did not permit a connection. The RRC layer 220 then enters an idle state at Step 16. The RRC layer 220 then sends, at Step 17, an indication signal to activate a packet transfer (RRC_ACT_IND_TO_MODEM). The modem 112 then, at Step 18, resumes packet transfer (IP_DATA_REQ (push back data)).

Continuing to FIG. 3C, an "active" flag is set to 1, indicating that a radio bearer establishment is requested. A bearer establishment procedure establishes a dedicated radio bearer for the UE 110. The RRC layer 220, at Step 19, then sends to the base station 120 a Tracking Area Update (TAU) Request. At Step 20, the TAU procedure is performed, and the base station 120 sends, at Step 21, to the RRC layer 220 a TAU Accept.

Tracking Area (TA) in LTE, as an example, is a logical concept of an area where the UE 110 can move around without updating the Mobility Management Entity (MME). The network allocates a list with one or more TAs to the UE 110. In certain operation modes, the UE 110 may move freely in all TAs of the list without updating the MME.

Each base station 120 broadcasts a tracking area code (TAC) to indicate to which TA the base station 120 belongs, and the TAC is unique within a Public Land Mobile Network (PLMN). Since PLMN has a unique number allocated to each of the system operator and TAC is unique in a PLMN. If the TAC and PLMN are combined, the result is a globally unique number. This number (PLMN+TAC) is called Tracking Area Identity (TAI).

The TA for each base station 120 is broadcast as follows. The UE 110 stores a group of TAC, and this group of TAC maintained in the UE 110 is called Tracking Area List. The UE 110 does not need to go through Tracking Area Update procedure as long as it moves along this TAI.

Finally, Steps 3-6, which were described above, are repeated. The final Step 6 is the base station 120 sending to the RLC layer 240, an acknowledgement of the PDUs.

The subject matter of this disclosure significantly improves packet latency/loss and retransmission. For example, in prior systems, uplink packets are lost after a RLF and Reestablishment Reject by the network; RLC unacknowledged packets, if any, are flushed locally inside the modem 112. Assuming that the packet is a SIP message for IP Multimedia Subsystem (IMS) signaling, then important SIP/UDP messages are lost, and the network 120 must wait until another SIP message is retransmitted by the UE 110 in order for proper IMS operation. This kind of SIP retransmission may take several seconds, and increases latency. The subject matter of the disclosure is an improvement in that the UE 110 is prevented from losing packets and waiting for a significant period of time to resume a packet transfer.

The following examples pertain to further embodiments.

Example 1 is an apparatus for reducing communication latency in a User Equipment (UE), comprising: a processor configured to: push back a packet, that is transmitted to but not acknowledged by a base station, from a Radio Link Control (RLC) layer; and trigger a Tracking Area Update (TAU) procedure based on the pushed back packets; and a radio frequency interface configured to transmit or receive the packet with the base station.

In Example 2, the subject matter of Example 1, wherein the processor is further configured to: store, in a memory the pushed back packet.

In Example 3, the subject matter of Example 1, wherein the processor is further configured to: retransmit the packet from the RLC layer to the base station until the base station acknowledges the packet or a maximum number of retransmissions has been reached.

In Example 4, the subject matter of Example 3, wherein the processor is further configured to: upon indication from the RLC layer that the maximum number of retransmissions has been reached, declare a Radio Link Failure (RLF).

In Example 5, the subject matter of Example 1, wherein the packet is a Protocol Data Units (PDU).

In Example 6, the subject matter of Example 5, wherein the processor is further configured to: push back a Packet Data Convergence Protocol (PDCP) packet, which is still being processed after the RLF, from the PDCP layer.

In Example 7, the subject matter of Example 6, wherein the processor is further configured to: store, in a memory, the pushed back PDCP packet.

In Example 8, the subject matter of Example 4, wherein the processor is further configured to: transmit from the Radio Resource Control (RRC) layer to the base station a Radio Resource Control (RRC) connection reestablishment request.

In Example 9, the subject matter of Example 8, wherein the processor is further configured to: push back the packet from the RLC layer after receipt by the RRC layer from the base station a rejection of the RRC connection reestablishment request.

In Example 10, the subject matter of Example 1, wherein the processor is further configured to: set a bearer establishment requested flag to active.

In Example 11, the subject matter of Example 10, wherein the active flag indicates that a bearer establishment procedure is expected to occur after the TAU procedure.

In Example 12, the subject matter of Example 1, wherein the processor is further configured to: indicate, from the RRC layer, that the UE is camped on a new cell.

In Example 13, the subject matter of Example 12, wherein the processor is further configured to: resume packet transfer after the UE is camped on the new cell.

Example 14 is a method to be performed by an apparatus in a User Equipment (UE), the method comprising: pushing back, by a processor, a packet that is transmitted to but not acknowledged by a base station, from a Radio Link Control (RLC) layer; and triggering, by the processor, a Tracking Area Update (TAU) procedure based on the pushed back packet.

In Example 15, the subject matter of Example 14, further comprising: storing, in a memory, the pushed back PDUs.

In Example 16, the subject matter of Example 14, further comprising: retransmitting the packet from the RLC layer to the base station until the base station acknowledges the packet or a maximum number of retransmission has been reached.

In Example 17, the subject matter of Example 16, further comprising: declaring a Radio Link Failure (RLF) upon indication from the RLC layer that the maximum number of retransmissions has been reached.

In Example 18, the subject matter of Example 14, wherein the packet is a Protocol Data Unit (PDU).

In Example 19, the subject matter of Example 18, further comprising: pushing back a Packet Data Convergence Protocol (PDCP) packet, which is still being processed after the RLF, from the PDCP layer.

In Example 20, the subject matter of Example 19, further comprising: storing, in a memory, the pushed back PDCP packet.

In Example 21, the subject matter of Example 17, further comprising: transmitting from the Radio Resource Control (RRC) layer to the base station a Radio Resource Control (RRC) connection reestablishment request.

In Example 22, the subject matter of Example 21, further comprising: pushing back the packet from the RLC layer after receipt by the RRC layer from the base station a rejection of the RRC connection reestablishment request.

In Example 23, the subject matter of Example 14, further comprising: setting a bearer establishment requested flag to active.

In Example 24, the subject matter of Example 14, further comprising: indicating, from the RRC layer, that the UE is camped on a new cell.

In Example 25, the subject matter of Example 24, further comprising: resuming packet transfer after the UE is camped on the new cell.

Example 26 is an apparatus for reducing communication latency in a User Equipment (UE), comprising: a processing means for: pushing back a packet that is transmitted to but not acknowledged by a base station, from a Radio Link Control (RLC) layer; and triggering a Tracking Area Update (TAU) procedure based on the pushed back packet; and a radio frequency interface means for transmitting or receiving the packet with the base station.

In Example 27, the subject matter of Example 26, wherein the processing means is further for: storing, in a memory the pushed back packet.

In Example 28, the subject matter of Example 26, wherein the processing means is further for: retransmitting the packet from the RLC layer to the base station until the base station acknowledges the packet or a maximum number of retransmissions has been reached.

In Example 29, the subject matter of Example 28, wherein the processing means is further for: upon indication from the RLC layer that the maximum number of retransmissions has been reached, declaring a Radio Link Failure (RLF).

In Example 30, the subject matter of any of Examples 26-29, wherein the packet is a Protocol Data Unit (PDU).

In Example 31, the subject matter of Example 30, wherein the processing means is further for: pushing back a Packet Data Convergence Protocol (PDCP) packet, which is still being processed after the RLF, from the PDCP layer.

In Example 32, the subject matter of Example 31, wherein the processing means is further for: storing, in a memory, the pushed back PDCP packet.

In Example 33, the subject matter of Example 29, wherein the processing means is further for: transmitting from the Radio Resource Control (RRC) layer to the base station a Radio Resource Control (RRC) connection reestablishment request.

In Example 34, the subject matter of Example 33, wherein the processing means is further for: pushing back the packet from the RLC layer after receipt by the RRC layer from the base station a rejection of the RRC connection reestablishment request.

In Example 35, the subject matter of Example 26, wherein the processing means is further for: setting a bearer establishment requested flag to active.

In Example 36, the subject matter of Example 35, wherein the active flag indicates that a bearer establishment procedure is expected to occur after the TAU procedure.

In Example 37, the subject matter of Example 26, wherein processing means is further for: indicating, from the RRC layer, that the UE is camped on a new cell.

In Example 38, the subject matter of Example 37, wherein the processing means is further for: resuming packet transfer after the UE is camped on the new cell.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. An apparatus for reducing communication latency in a User Equipment (UE), comprising:
a processor configured to:
  push back a packet that is transmitted but not acknowledged by a base station, from a Radio Link Control (RLC) layer; and
  trigger a Tracking Area Update (TAU) procedure based on the pushed back packet; and
a radio frequency interface configured to transmit or receive the packet with the base station.

2. The apparatus of claim 1, wherein the processor is further configured to:
store, in a memory, the pushed back packet.

3. The apparatus of claim 1, wherein the processor is further configured to:
retransmit the packet from the RLC layer to the base station until the base station acknowledges the packet or a maximum number of retransmissions has been reached.

4. The apparatus of claim 3, wherein the processor is further configured to:
upon indication from the RLC layer that the maximum number of retransmissions has been reached, declare a Radio Link Failure (RLF).

5. The apparatus of claim 1, wherein the packet is a Protocol Data Unit (PDU).

6. The apparatus of claim 5, wherein the processor is further configured to:
push back a Packet Data Convergence Protocol (PDCP) packet, which is still being processed after the RLF, from the PDCP layer.

7. The apparatus of claim 6, wherein the processor is further configured to:
store, in a memory, the pushed back PDCP packet.

8. The apparatus of claim 4, wherein the processor is further configured to:
transmit from the Radio Resource Control (RRC) layer to the base station a Radio Resource Control (RRC) connection reestablishment request.

9. The apparatus of claim 8, wherein the processor is further configured to:
push back the packet from the RLC layer after receipt by the RRC layer from the base station a rejection of the RRC connection reestablishment request.

10. The apparatus of claim 1, wherein the processor is further configured to:
set a bearer establishment requested flag to active.

11. The apparatus of 10, wherein the active flag indicates that a bearer establishment procedure is expected to occur after the TAU procedure.

12. The apparatus of claim 1, wherein the processor is further configured to:
indicate, from the RRC layer, that the UE is camped on a new cell.

13. The apparatus of 12, wherein the processor is further configured to:
resume packet transfer after the UE is camped on the new cell.

14. A method to be performed by an apparatus in a User Equipment (UE) for reducing communication latency, the method comprising:
pushing back, by a processor, a packet that is transmitted to but not acknowledged by a base station, from a Radio Link Control (RLC) layer; and
triggering, by the processor, a Tracking Area Update (TAU) procedure based on the pushed back packet.

15. The method of claim 14, further comprising:
storing, in a memory, the pushed back PDU.

16. The method of claim 14, further comprising:
retransmitting the packet from the RLC layer to the base station until the base station acknowledges the packet or a maximum number of retransmissions has been reached.

17. The method of claim 16, further comprising:
declaring a Radio Link Failure (RLF) upon indication from the RLC layer that the maximum number of retransmissions has been reached.

18. The method of claim 14, wherein the packet is a Protocol Data Units (PDU).

19. The method of claim 18, further comprising:
pushing back a Packet Data Convergence Protocol (PDCP) packet, which is still being processed after the RLF, from the PDCP layer.

20. The method of claim 19, further comprising:
storing, in a memory, the pushed back PDCP packet.

21. The method of claim 17, further comprising:
transmitting from the Radio Resource Control (RRC) layer to the base station a Radio Resource Control (RRC) connection reestablishment request.

22. The method of claim 21, further comprising:
pushing back the packet from the RLC layer after receipt by the RRC layer from the base station a rejection of the RRC connection reestablishment request.

23. The method of claim 14, further comprising:
setting a bearer establishment requested flag to active.
24. The method of claim 14, further comprising:
indicating, from the RRC layer, that the UE is camped on a new cell.
25. The method of 24, further comprising:
resuming packet transfer after the UE is camped on the new cell.

* * * * *